United States Patent
Venture et al.

(10) Patent No.: US 11,042,833 B2
(45) Date of Patent: Jun. 22, 2021

(54) AUTOMATED AUTOVALIDATING LOCKER SYSTEM

(71) Applicant: QUADIENT TECHNOLOGIES FRANCE, Bagneux (FR)

(72) Inventors: Guy Venture, Senas (FR); Jean-Baptiste Pantaloni, Cavaillon (FR); Bruno Rostaing, Senlisse (FR)

(73) Assignee: QUADIENT TECHNOLOGIES FRANCE, Bagneux (FR)

( * ) Notice: Subject to any disclaimer, the term of this patent is extended or adjusted under 35 U.S.C. 154(b) by 478 days.

(21) Appl. No.: 15/863,633

(22) Filed: Jan. 5, 2018

(65) Prior Publication Data

US 2018/0197141 A1 Jul. 12, 2018

(30) Foreign Application Priority Data

Jan. 6, 2017 (EP) ..................... 17305016

(51) Int. Cl.
*G06Q 10/08* (2012.01)
*G06K 19/077* (2006.01)
*G06K 7/10* (2006.01)

(52) U.S. Cl.
CPC ..... *G06Q 10/0836* (2013.01); *G06K 7/10366* (2013.01); *G06K 19/07758* (2013.01)

(58) Field of Classification Search
CPC .. G06Q 10/08; G06Q 10/083; G06Q 10/0833; G06Q 10/0835; G06Q 10/0836; G06Q 10/0837
USPC ........................................................ 705/333
See application file for complete search history.

(56) References Cited

U.S. PATENT DOCUMENTS

| 4,836,352 A | 6/1989 | Tateno et al. |
| 6,323,782 B1 | 11/2001 | Stephens et al. |
| 6,707,381 B1 | 3/2004 | Maloney |
| 6,895,241 B2 | 5/2005 | Hara |
| 7,105,820 B2 | 9/2006 | Federici et al. |
| 7,233,682 B2 | 6/2007 | Levine |

(Continued)

FOREIGN PATENT DOCUMENTS

| CN | 201833357 U | 5/2011 |
| EP | 1 587 401 B1 | 5/2010 |

(Continued)

OTHER PUBLICATIONS

Digikey.com, "A Designer's Guide to RFID", May 2, 2013, available at: https://www.digikey.com/en/articles/a-designers-guide-to-rfid, last accessed Dec. 28, 2020, (Year: 2013).*

(Continued)

*Primary Examiner* — Emmett K. Walsh
(74) *Attorney, Agent, or Firm* — Cozen O'Connor

(57) ABSTRACT

An electronic parcel locker system for shipments delivery and pick-up, comprising at least one electronic parcel locker having compartments for storing shipments, the electronic parcel locker system further comprising a RFID area system comprising a RFID reader and at least one antenna for reading tags affixed onto shipments to be deposited in the compartments of the at least one electronic parcel locker and at least one RFID compartment system integrated in each of the compartments for reading tags affixed onto shipments deposited in the compartments.

20 Claims, 7 Drawing Sheets

(56) References Cited

U.S. PATENT DOCUMENTS

| | | | |
|---|---|---|---|
| 7,372,262 B2 | 5/2008 | Bertozzi et al. | |
| 8,234,006 B1* | 7/2012 | Sachar | G06Q 10/087 700/216 |
| 2002/0080030 A1 | 6/2002 | Inomata | |
| 2003/0138147 A1 | 7/2003 | Ongkojoyo | |
| 2004/0076544 A1 | 4/2004 | Dao | |
| 2005/0068178 A1 | 3/2005 | Lee et al. | |
| 2005/0264422 A1 | 12/2005 | Watanabe et al. | |
| 2006/0043298 A1 | 3/2006 | Kawase et al. | |
| 2006/0152339 A1 | 7/2006 | Mercier et al. | |
| 2009/0119232 A1 | 5/2009 | Mercier et al. | |
| 2009/0285353 A1 | 11/2009 | Ellenbogen et al. | |
| 2011/0174551 A1 | 7/2011 | Lucas et al. | |
| 2012/0194043 A1 | 8/2012 | Turner et al. | |
| 2012/0211397 A1 | 8/2012 | Kilian | |
| 2012/0326840 A1* | 12/2012 | Frankenberg | G07F 17/12 340/5.65 |
| 2013/0119129 A1 | 5/2013 | Amdahl et al. | |
| 2013/0248425 A1 | 9/2013 | Kunnen | |
| 2014/0035721 A1 | 2/2014 | Heppe et al. | |
| 2015/0077221 A1 | 3/2015 | Peters et al. | |
| 2015/0112887 A1 | 4/2015 | Camp | |
| 2015/0193732 A1 | 7/2015 | Bouzit-Benbernou | |
| 2015/0193733 A1 | 7/2015 | Bouzit-Benbernou | |
| 2015/0294260 A1* | 10/2015 | Napoli | G06Q 10/087 705/337 |
| 2015/0379464 A1* | 12/2015 | Turner | G07F 17/12 705/339 |
| 2016/0294601 A1 | 10/2016 | Frederick | |
| 2017/0193258 A1 | 7/2017 | Venture et al. | |
| 2017/0220828 A1 | 8/2017 | Venture et al. | |
| 2018/0060812 A1* | 3/2018 | Robinson | G06Q 40/02 |

FOREIGN PATENT DOCUMENTS

| | | |
|---|---|---|
| FR | 2 851 360 A1 | 8/2004 |
| WO | 2006050412 A1 | 5/2006 |
| WO | 2013/170316 A1 | 11/2013 |

OTHER PUBLICATIONS

Medeiros et al., RFID Smart Shelf With Confined Detection Volume at UHF; IEEE Antennas and Wireless Propagation Letters, vol. 7, 773, 776, (Year: 2008).*
Extended European Search Report, dated Jul. 20, 2017, for European Application No. 17305016.2-1806, 6 pages.
Extended European Search Report, dated Jun. 23, 2016, for European Application No. 16305010.7-1806, 6 pages.
Extended European Search Report, dated Mar. 28, 2014, for European Application No. 14305011.0-1953, 8 pages.
Extended European Search Report, dated Nov. 28, 2014, for European Application No. 14305012.8-1953, 9 pages.
Extended European Search Report, dated Oct. 15, 2014, for European Application No. 14305012.8-1953, 9 pages.
Partial European Search Report, dated Apr. 11, 2014, for European Application No. 14305012.8-1953, 6 pages.
European Search Report, dated Jul. 7, 2017, for EP17305016, 2 pages.

* cited by examiner

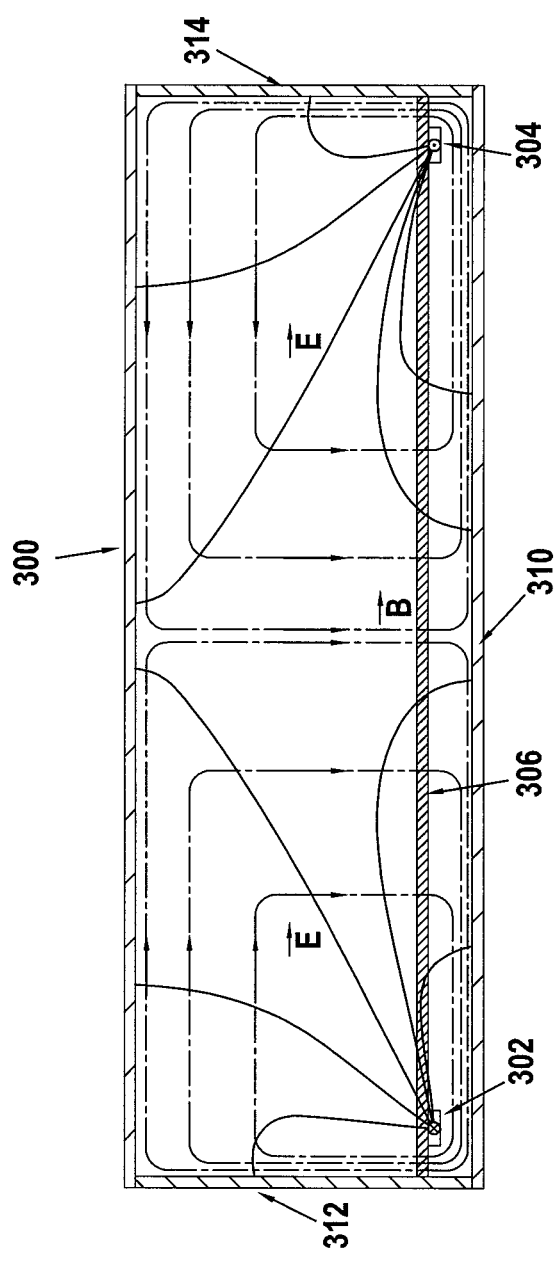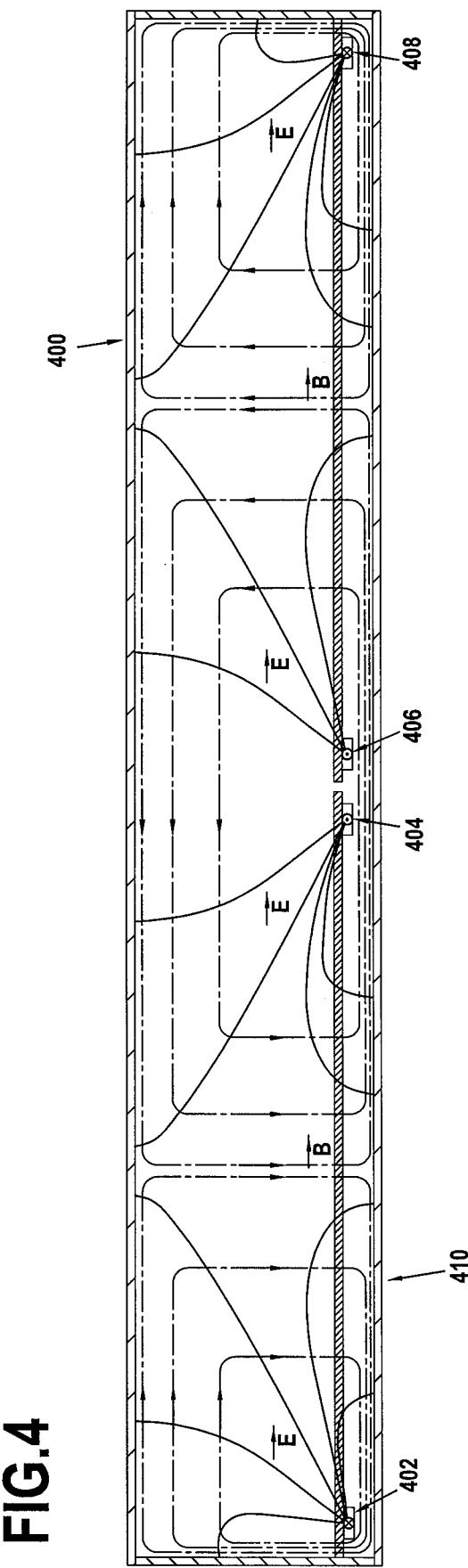

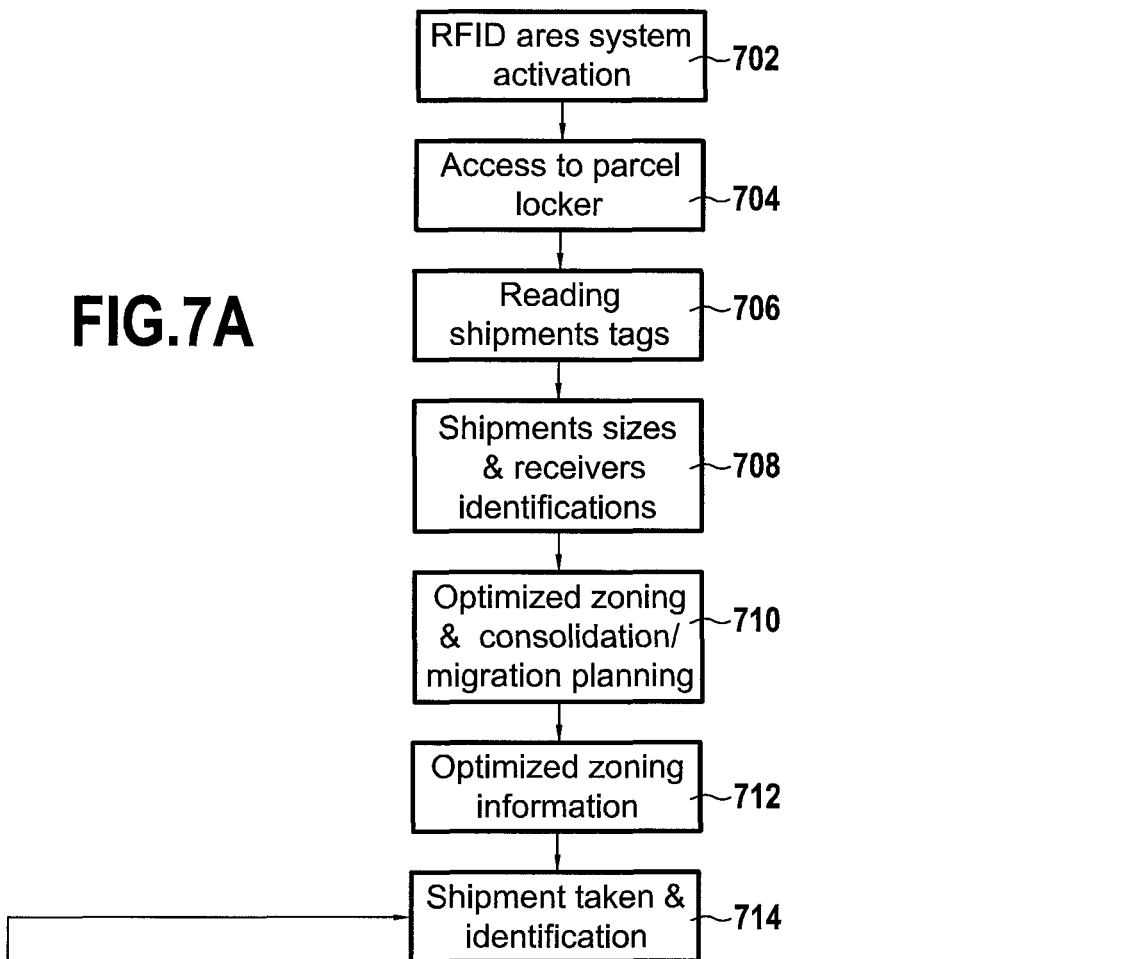
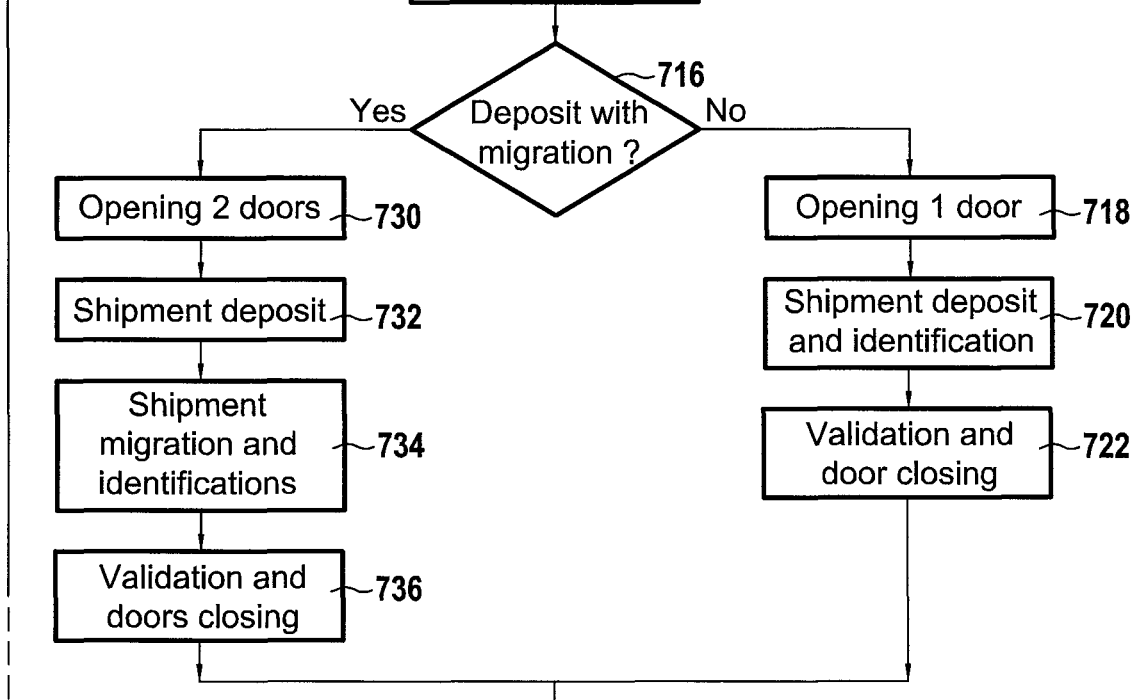

AUTOMATED AUTOVALIDATING LOCKER SYSTEM

TECHNICAL FIELD

The present application relates to a method and system for depositing shipments by a delivery agent into an electronic parcel locker system comprising several lockable compartments and for picking up these shipments thereafter, and more particularly to radiofrequency identification data (RFID) systems designed for improving the shipment deposit and collection processes related to electronic parcel lockers.

BACKGROUND

Parcel locker systems are used for depositing, storing and picking up various kinds of shipments such as parcels or packages. A parcel locker comprises a series of compartments with different sizes, which are equipped with electronically controlled doors. Usually, the parcel locker also comprises, included in a parcel locker interface, a reading device, typically a barcode reader, for identifying shipments. The shipments are deposited by carrier agents in the parcel locker, and are then picked-up from the parcel locker by receivers of the shipments. When a shipment is not picked up in due time by the receiver, it needs to be collected by the carrier for freeing the parcel locker for other shipments. This process is called collection by a carrier agent.

For parcel lockers currently in use, user errors are often made during the deposit and the collection processes, and impact the shipment tracking and the management of parcel lockers. Typically, a deposit or a collection in a parcel locker is established based on the succession of steps for the deposit or collection process, including generally a manual entry of the shipment identifiers. For example, during a deposit process, the system establishes that because a door has been opened and closed, a deposit is completed. In a number of cases, based on the succession of steps and associated events, the system may establish an erroneous status following on errors or unexpected actions of a carrier agent or of a receiver. For example, because a door has been opened and closed, the system may establish that a deposit is completed, but in fact no shipment is actually deposited in the compartment or another shipment is deposited, or the system may establish that a collection is completed, but in fact the shipment still remains in the compartment or another shipment is deposited in the compartment, or the system may establish that a pick-up is completed, but in fact the shipment still remains in the compartment or another shipment is deposited in the compartment. In order to alert on such errors, weighing systems sometimes have been implemented in each compartment. However, weighing systems have issues. Often, these systems make weighing errors for distinguishing whether there is a shipment of no shipment in the compartment, especially when the shipment is rather lightweight. Additionally, weighing systems cannot validate the shipment identification. Usually, weighing is a tentative matching method for alerting on an erroneous deposit that is primarily used for preventing from hazardous product deposit in a parcel locker, which is typically located in a public area. However, discrepancies between the reference weight for a shipment provided by the sender or by the carrier and the weight measured by the parcel locker weighing system often result into errors.

More generally, the identification of the shipment in a parcel locker compartment is uncertain. Usually, for a carrier agent to deposit shipments into a parcel locker, the identification of each shipment must be captured by the parcel locker and associated with the compartment where it is deposited. For tracking purposes, an identification means in the form of a barcode label is affixed onto each shipment. The capture of each shipment identification means is performed with the barcode reader included in the parcel locker interface. However, between the shipment identification capture and the shipment deposit in the compartment, shipments mishandling may occur and an erroneous association of compartment and of shipment identification may take place.

Additionally, the current processes are inefficient in terms of depositing, collecting or picking-up shipments and the compartment space management is not optimized. During the shipments deposit process, the carrier agent must scan manually or enter manually each shipment identification, and eventually must select manually the compartment size corresponding to the shipment size to be deposited, which is a time-consuming operation. For example, in the case of barcode reading technology, the carrier agent has to position the shipment identification barcode in front of the barcode reader comprised in the parcel locker user interface. This means that, after depositing a shipment in a compartment, the agent carrier must come back to the parcel locker user interface for capturing the identifier of the next shipment to be deposited, which is both time-consuming and tiresome for the agent. Regarding the compartment space management, currently parcel lockers associate one shipment with one compartment and do not perform any shipments consolidation for the same receiver. This lack of consolidation uses more parcel locker space than necessary and obliges the receiver to open several compartments rather than accessing his shipments in a consolidated compartment. Moreover, the combination of the deposit and collection processes is usually not optimized. Generally, when a carrier agent performs some shipments deposit, he also performs a collection of shipments, which have not been picked in due time up by receivers. In order to prevent the carrier agent from mixing up collected shipments with the shipments for deposit, the agent carrier is required to first deposit all the incoming shipments that he brings with him, and then to perform the collection. If some incoming shipments cannot be fitted into the parcel locker, then they are taken away by the carrier agent with the collected shipments and eventually dispatched via another distribution channel such as a relay point in a shop partnering with the carrier. It is therefore beneficial to be able to offer a parcel locker system providing means for validating shipments deposited in compartments and for consolidating shipments in order to free compartments for additional deposits.

Different sensor technologies can be considered for a parcel locker for detecting a shipment and for capturing information attached to the shipment, but a UHF system is clearly preferable in terms of combined detection efficiency, ease of use and low cost. However, as well known by those skilled in the art, radiative UHF RFID waves, generated by standard RFID UHF antennas, cannot propagate correctly within small electrically conductive cavities such as parcel lockers' compartments. There is therefore a need for a UHF system capable of reading UHF RFID tags in a parcel locker's compartments.

SUMMARY

Described are embodiments of an electronic parcel locker system for validating the shipments deposited in electronic parcel lockers and improving the productivity of the deposit, the collection and the pick-up processes, and therefore overcoming the above drawbacks of currently used parcel lockers.

The embodiments can include an UHF radio frequency identification system for reading information of shipments in an area in front of an electronic parcel locker and for reading information of shipments in each compartment of the electronic parcel locker. Wireless short distance radiofrequency communication is a preferred solution as radiofrequency communication allows a diffuse transmission and is tolerant to radiofrequency devices being hidden, as opposed to optical solutions, which are more directional and quite intolerant to blocking bodies lying in the transmission path. For standard UHF systems, the remote communication with the UHF RFID tag is carried out by a propagating electromagnetic wave. Typically, the antennas of UHF RFID tags consist of dipoles, which primarily interact with the electric field of the electromagnetic wave. UHF RFID is the preferred technology for the electronic parcel lockers described herein because UHF RFID tags are much less expensive than HF RFID tags. This economical factor is essential as for this invention a RFID tag must be attached onto each shipment. The terms RFID tag or RFID tags are used interchangeably with the terms RFID transponder or RFID transponders.

Embodiments include an electronic parcel locker system for shipments delivery and pick-up, comprising at least one electronic parcel locker having compartments for storing shipments, and which comprises: a RFID area system comprising a RFID reader and at least one antenna for reading tags affixed onto shipments to be deposited in said compartments of said at least one electronic parcel locker and at least one RFID compartment system integrated in each of said compartments for reading tags affixed onto shipments deposited in said compartments. Such a system allows reading all RFID tags in the front area of the electronic parcel locker, and therefore automatically identifying shipments or carrier agents or maintenance agents or even receivers or senders of shipments for example if they hold a RFID ID card (e.g., card with an RFID tag). A valuable benefit of such a system is that no manual entry of an identification is required neither for a shipment to be deposited, nor for a user of an electronic parcel locker.

At least one electronic parcel locker comprises a control unit and each of said compartments comprises a door, wherein said control unit is configured for electronically controlling said door and for opening said door in response to a signal provided by said RFID area system resulting from said RFID area system identifying a tag affixed onto a moving shipment. Therefore, targeting only shipment tags, the electronic parcel locker can identify the particular shipment, which is taken by a carrier agent for deposit, and can open automatically appropriate compartments. Preferably, the identification of a tag affixed onto a moving shipment is based on the phase of the signal emitted by said tag and captured by said RFID area system or based on the Fourier analysis of the signal emitted by said tag and captured by said RFID area system.

Advantageously, each of said compartments has an internal volume wherein said RFID compartment system is configured to have a reading range covering said internal volume, and said internal volume has a maximum dimension and said RFID compartment system operates at an UHF wavelength wherein said maximum dimension is below twice said UHF wavelength. When a shipment is deposited in a compartment, its RFID tag is read by the RFID compartment system for shipment validation.

In a preferred embodiment, said RFID compartment system comprises a wire wave guide composed of two conductive lines positioned in parallel above a ground surface and generating a propagative non-radiating UHF electromagnetic wave along said conductive lines within said compartment, wherein each of said two conductive lines has an entry extremity connected to a feed line comprised in each of said two conductive lines and an exit extremity, wherein said exit extremity is connected to said ground surface via a load, and wherein a feed line of one of said two conductive lines is a half wave length longer than a feed line of the other of said two conductive lines.

Preferably, each of said compartments further comprises side walls and said ground surface is one of said side walls, and each of said two conductive lines is composed of two straight conductors made of discontinued conductive segments positioned side by side so that the line discontinuities are distributed alternatively along said two straight conductors and with at the extremity of each of said two straight conductors an end segment whose length is half the length of the other said segments.

Advantageously, each of said two conductive lines are positioned at a distance above said ground surface within the range 2 mm to 4 mm and at a distance from compartment walls adjacent to said ground surface within the range 2 mm to 4 mm. In a particular embodiment, each of said two conductive lines is a micro-strip line made of copper or aluminium and drawn on an insulating support.

In a particular embodiment, said RFID compartment system comprises several said wire wave guides assembled in parallel side by side. The RFID wire guide of the invention is a low cost antenna-like installed in each electronic parcel locker compartment for communicating with shipment RFID tags stored in the compartment. Combining the non-radiative behavior of the RFID wire guide with the Faraday cage effect of metallic compartments, the UHF signal is confined within each compartment, and any leakage is prevented. The RFID wire guides in the compartments ensure the automatic validation of the shipments deposited or picked up from the electronic parcel locker, therefore avoiding any of the errors occurring in operating current parcel lockers. They also serve as shipment detectors and avoid the need for weighing and the associated issues with weighing.

In a preferred embodiment, the UHF radio frequency identification system further comprises a memory storage comprising a compartments mapping table for storing an association of a shipment identifier stored in a tag affixed onto said shipment and read by said at least one RFID compartment system and of a compartment in which said shipment is deposited. Preferably, the shipment identifier is unique.

Advantageously, said memory storage further comprises a table for storing a shipment identifier for a shipment to be deposited in said at least one electronic parcel locker so that said shipment identifier is compared with a shipment identifier stored in a tag affixed onto said shipment and read by said at least one RFID compartment system.

In a particular embodiment, the UHF radio frequency identification system further comprises a remote shipping system comprising a first cryptographic module, a second cryptographic module included in said at least one electronic locker, and a transmission network for exchanging encrypted data between said remote shipping system and said at least one electronic locker.

Preferably, said control unit is included in said at least one electronic parcel locker or is part or entirely located remotely from said at least one electronic parcel locker.

The usage of these RFID systems allows improvements for operating electronic parcel lockers. Described embodiments concern in particular a method for optimized zoning for deposit and collection and pick-up of shipments within at least one electronic parcel locker comprising: reading at least a shipment identifier in each tag affixed onto each shipment for deposit with an UHF RFID area system; identifying a size and a receiver identifier for each shipment for deposit based on said shipment identifier; comparing said receiver identifier with receiver identifiers of shipments deposited in said at least one electronic parcel locker based on a compartments mapping table; identifying compartments within said at least one electronic parcel locker for consolidation and for migration of shipments with a same receiver identifier based on sizes of shipments deposited in said at least one electronic parcel locker and based on the sizes of shipments for deposit so as to minimize the zone where the deposit and collection take place; and planning for deposit and for collection of shipments within said at least one electronic parcel locker based on identified compartments for consolidation and for migration and based on said compartments mapping table so as to minimize the zone where the deposit and collection take place.

Preferably, if shipments for a same receiver identifier do not fit in a compartment of said at least one electronic parcel locker, compartments planned to be used for said shipments corresponding to said same receiver identifier are defined as near as possible so as to facilitate shipments pick-up.

Advantageously, shipment identifiers of shipments deposited in a compartment of said at least one electronic parcel locker and sizes of said shipments and a receiver identifier of said shipments are stored in a shipment identifiers and associated data table, wherein said compartments mapping table associates said compartment with said shipment identifiers and with said sizes and with said receiver identifier. When a carrier agent arrives for deposit and collection of shipments with affixed RFID tags, the system automatically identifies the agent and the shipments for deposit, makes matches with shipments already stored and plans for consolidations for identical receivers. The system plans on which compartments must be used in order to optimize the compartment size usage and defines the optimized zoning in order to minimize the carrier travel for deposit and collection.

Embodiments also concern a method for consolidating shipments within at least one electronic parcel locker comprising: comparing a receiver identifier of a shipment for deposit with receiver identifiers of shipments deposited in said at least one electronic parcel; identifying a compartment for consolidation containing shipments with said receiver identifier of a shipment for deposit based on a compartments mapping table and based on sizes of shipments deposited in said compartment for consolidation and on a size of said shipment for deposit so that said shipment for deposit and said shipments deposited in said compartment fit into said compartment for consolidation; automatically opening a door of said compartment for consolidation; depositing said shipment for deposit in said compartment for consolidation; automatically reading a shipment identifier of a shipment deposited in said compartment for consolidation; and validating said shipment deposited in said compartment before closing said compartment door based on readings performed by at least one RFID compartment system.

Preferably, said automatically opening a door is driven by the identification of a tag affixed onto a moving shipment by said RFID area system based on the phase of the signal emitted by said tag and captured by said RFID area system or based on the Fourier analysis of the signal emitted by said tag and captured by said RFID area system and wherein said tag stores said shipment identifier of said shipment for deposit.

Advantageously, said identifying a compartment for consolidation is based on said method for optimized zoning. When a carrier agent takes a shipment for deposit, the electronic parcel locker automatically opens the appropriate compartment, which is not empty when consolidation is possible. In a particular embodiment especially valuable for the receiver, such a consolidation of shipments can be performed for different carriers using the same electronic parcel locker.

The embodiments also concern a method for migrating shipments within at least one electronic parcel locker comprising: comparing a receiver identifier of a shipment for deposit with receiver identifiers of shipments deposited in said at least one electronic parcel locker; identifying a compartment containing shipments for migration with said receiver identifier of a shipment for deposit based on a compartments mapping table and based on sizes of said shipments for migration and on a size of said shipment for deposit; identifying a compartment for migration based on said compartments mapping table and based on sizes of said shipments for migration and on a size of said shipment for deposit so that said shipment for migration and said shipments for deposit fit into said compartment for migration; automatically opening a first door of said compartment containing shipments for migration; automatically opening a second door of said compartment for migration; removing said shipments for migration from said at least one electronic parcel locker and depositing them in said compartment for migration; automatically reading shipment identifiers of shipments deposited in said compartment for migration; and validating migration of said shipments deposited in said compartment for migration before closing compartment first and second doors based on readings performed by at least one UHF RFID compartment system.

In a preferred embodiment, openings of said first door of said compartment containing shipments for migration and of said second door of said compartment for migration are driven by the identification of a tag affixed onto a moving shipment by said UHF RFID area system. Preferably, the compartment for migration is empty.

Advantageously, said identifying a compartment containing shipments for migration and said identifying a compartment for migration are based on said method for optimized zoning. Preferably, said shipment identifiers of said shipments deposited in said compartment for migration are read by a UHF RFID compartment system.

The RFID compartment systems integrated in each compartment perform an automatic validation of the actions of the user operating the electronic parcel locker. After any collection or deposit with or without consolidation or migration, the general rule carried out by the control unit is that all doors are closed before any other action can take place, and the next door opening guides the carrier agent for his next deposit or collection. Although it may be more convenient for the carrier agent to start depositing the shipments that he brings with him before collecting because this way he limits the number of shipments that he has on hand, the electronic parcel locker system of the invention can be flexible for handling deposits and collections in any preferred order. The flexibility for handling deposits and collections in any preferred order for a carrier agent is secured by the capability to validate each shipment deposit or collection thanks to its RFID reading systems, which for example can ensure that a collected shipment is not re-deposited.

BRIEF DESCRIPTION OF THE DRAWINGS

Other aspects, features and advantages of the present teachings will become clearer to those ordinary skilled in the art upon review of the following description in conjunction with the accompanying drawings where:

FIG. 3 represents the electromagnetic fields in an electrically conductive compartment with a rectangular section generated by two parallel electrically conductive lines;

FIG. 4 illustrates a parallel assembly of two two-lines wire wave guides near the bottom wall of a compartment;

FIGS. 7A and 7B illustrate the process how shipments are deposited and collected by a carrier agent according to the invention;

DETAILED DESCRIPTION

A parcel locker of the invention includes a RFID area system for reading information of shipments brought by a carrier agent or a user in an area in front of the parcel locker and RFID compartment systems integrated in each compartment of the parcel locker. The RFID area system is an UHF RFID system for reading UHF RFID tags affixed onto shipments to be deposited in the parcel locker. The RFID compartment system is an UHF RFID system for reading UHF RFID tags affixed onto shipments, which have been deposited in a parcel locker compartment. The RFID tag can be attached on the packaging of the product to be shipped, but it can also be attached directly onto the product. The capability of a RFID system being able to communicate with tags through the packaging provides immediate benefits in terms of limiting damages of the tag, which is protected by the packaging, and even in terms of information confidentiality. The RFID tags can be affixed onto the product by the product manufacturer and can be used by the manufacturer for internal tracking before being used along the overall logistic chain.

Figure 1:
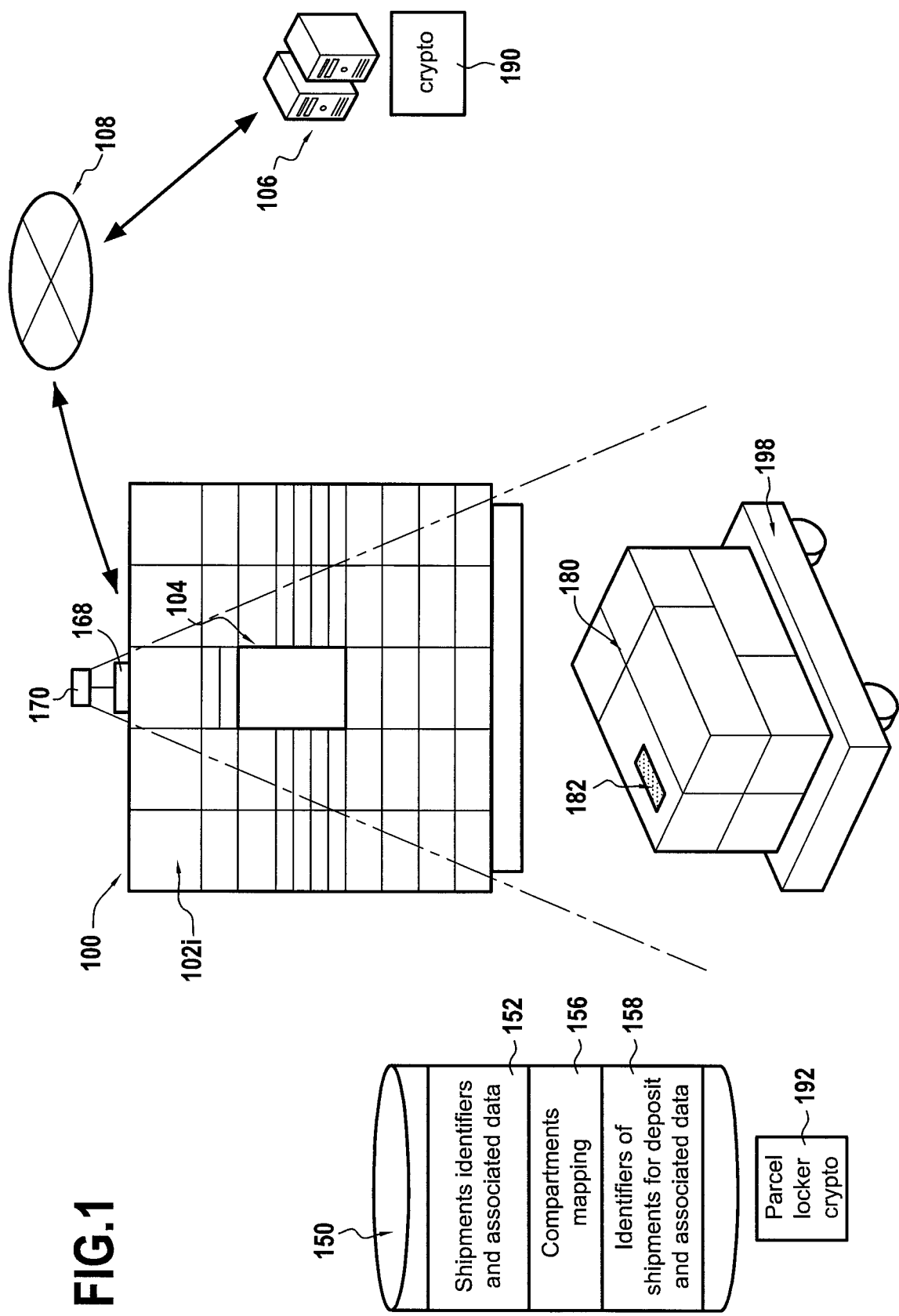
FIG. 1 represents a parcel locker equipped with a RFID area system.

FIG. 1 illustrates a parcel locker 100 equipped with a RFID area system. The parcel locker 100 comprises a series of compartments 102i of different sizes and equipped with an electronically controlled door. The parcel locker operation, and in particular the opening and closing of the compartment doors, is controlled by a control unit 104, which also controls the RFID area system. The control unit 104 may include one or more microprocessors, microcontrollers, non-volatile memory, volatile memory, magnetic or optical spinning storage media, Flash memory, etc. The control unit 104 is communicatively coupled to one or more actuators, for example one or more solenoids, electrical motors, or relay switches, which operate one or more latches to lock and unlock the doors, and, or to actively move the doors between open and closed positions.

The parcel locker can communicate with a remote shipping system 106 via a long distance communication network 108 based on a technology such as 3G-4G GSM. The remote shipping system 106, in particular, manages authorizations for accessing the parcel locker as well as data regarding the shipments handled by the parcel locker. In another embodiment, data exchange between the parcel locker and the remote shipping system can be performed, not directly via a long distance communication network, but indirectly via a user mobile device connected with the parcel locker via a short distance communication network, such as local wireless network WIFI or Bluetooth, and connected with the remote shipping system via a long distance communication network. A parcel locker user communication means is available for the user to operate the parcel locker and can include for example a touchscreen or a speaker or microphone or camera on the parcel locker and/or on the user mobile device. The user, for his interaction with the parcel locker and his handling of the shipments, is provided with digital messages on the parcel locker interface and/or on the user mobile device interface, and/or with sound messages from the parcel locker and/or from the user mobile device. Additional information or alerting signals can also be provided on the parcel locker, for example in the form of coloured lights. The user can communicate and respond to the parcel locker via communication means such as the parcel locker interface or the user mobile device interface, and/or voice recognition means in the parcel locker and/or in the user mobile device.

The identifiers of the shipments deposited in the parcel locker compartments are stored in a Shipment identifiers and associated data table 152 of a memory storage 150 of the parcel locker. Preferably, a shipment identifier is unique. However, some shipments may share the same identifier as long as they are not handled in the same parcel locker at the same time or as long as their handling in the same parcel locker at the same time can be managed by the parcel locker, for example if they are identical and intended for the same receiver. The term memory storage may correspond to different memories as well as different types of memories including ROM, hard drive, flash drive, or the like and databases. The data associated with a shipment identifier in table 152 include the size of the shipment or an identifier of the receiver of the shipment, such as for example a mobile phone number or an email of the receiver. The associations between compartments of the parcel locker and the shipment identifiers for each of the shipments deposited in the parcel locker are maintained in a Compartments mapping table 156 of the memory storage 150, which also can map the associated shipment size or receiver identifier. Preferably, the identifiers of the shipments to be deposited are stored in an Identifiers of shipments for deposit and associated data table 158 of the memory storage 150 so that a check regarding deposits can be performed by the parcel locker. The associated data in table 158 can include information such as the shipments sizes or receivers identifiers or receivers profiles. The shipment identifiers for deposit and the associated data stored in table 158 can be used for example to perform some checks during or following on a deposit by a carrier agent. The list of identifiers for the shipments to be deposited in a particular parcel locker as well as the associated data are transmitted from the remote shipping system 106 to the parcel locker via a transmission network, which can be for example directly via the long distance communication network 108 or via a user mobile device, which can receive data from the remote shipping system 106. In a preferred embodiment, all data exchanged between the remote shipping system 106 and the parcel locker are encrypted in order to ensure authentication and eventually also confidentiality. Preferably, in order to secure data authentication, the data emitter, either the remote shipping system 106 or the parcel locker 100, cryptographically signs the data to be transmitted with a private key and the data receiver, either the remote shipping system 106 or the parcel locker 100, cryptographically verifies the data signature with a public key. It is easily devised by those ordinary skilled in the art that the Shipment identifiers and associated data table 152 or the Compartments mapping table 156 or the Identifiers of shipments for deposit and associated data table 158 can also be remotely stored, for example in the remote shipping system 106, rather than in the memory storage 150 of the parcel locker, and on demand be accessed to by the parcel locker, for example via the long distance communication network 108.

The RFID area system comprises a UHF RFID reader 168 and at least one antenna 170, and transmits interrogation signals, receives response signals, and detects RFID tags within the detection volume covered by the radiative electromagnetic field generated by the at least one antenna. The UHF RFID reader can be installed near the antenna on top of the parcel locker or near the control unit 104. When the carrier agent brings some shipments 180 within this volume, the UHF RFID tags 182 affixed onto the shipments 180 can be read by the RFID area system. The information read from the UHF RFID tag includes at least the shipment identifier and may also include the size of the shipment or the identifier of the receiver of the shipment or the receiver's profile. Based on the shipment identifier, the identifier of the receiver of the shipment or the size of the shipment or the receiver's profile can also be retrieved from the data transferred to the parcel locker from the remote shipping system, and which are stored in the Identifiers of shipments for deposit and associated data table 158.

In a preferred embodiment, the RFID area system operates in a standard manner and randomly scans the UHF RFID tags present in the detection volume. Typically, a tag reading occurs every 1 millisecond and the tags of all the shipments brought by the carrier agent are detected and read by the RFID area system. Any user of the parcel locker carrying an UHF RFID identification, for example an UHF RFID tag embedded in card, can be identified with the RFID area system. Such an automatized identification can be used as an efficient access authorization to the parcel locker and is particularly appropriate for a carrier agent when he arrives near the parcel locker for the deposit of some shipments or for an authorized maintenance agent, but it can also apply to receivers or senders of shipments if they have for example a registered RFID identification card. Preferably, the access authorization to the parcel locker is based on cryptographic technologies for authentication and/or confidentiality. In a preferred embodiment, the user identification is provided by a mobile device equipped with RFID communication means and carried by the parcel locker user. In this case, the cryptographic generation of the user identification is performed by a cryptographic module 190 stored in the remote shipping system 106, and during the receiver access authorization procedure, the user identification is interpreted by a cryptographic module 192 controlled by parcel locker control unit. These cryptographic modules can also be used for authentication of all data exchanged between the remote shipping system 106 and the parcel locker 100. The capture by the RFID area system, when the user arrives in front of the parcel locker, of RFID information such as information from tags attached onto shipments or from user RFID identification is called group capture.

The information captured by the RFID area system during the group capture is transferred to the parcel locker control unit 104. This applies in particular to the identifiers of all the shipments brought for deposit by the carrier agent, but it can also apply to the identifier of a shipment brought back by a receiver for returning the shipment. When some new shipments to be deposited by the carrier agent are intended to the same receiver as some shipments already deposited in the parcel locker, all these shipments intended to the same receiver need to be consolidated, if possible in the same compartment, in order to minimize the number of compartments used and therefore optimize the compartments usage. However, when all the shipments intended to the same receiver, i.e. the new shipments to be deposited by the carrier agent and the shipments already deposited in a compartment, cannot fit into the compartment where previously deposited shipments are stocked, if a migration into a larger compartment can take place, the shipments intended to the same receiver need to be migrated and consolidated in the same larger compartment in order to optimize the compartments usage. Based on the shipment identifiers captured by the RFID area system, the control unit compares the receivers identifiers of the shipments brought for deposit with the receivers of the shipments already in the parcel locker and defines the shipments consolidations, which have to take place, and identifies in which compartments these consolidations must take place based on the compartments mapping of the parcel locker. Based on the sizes of the shipments to be deposited, the control unit verifies that the consolidations can take place and plans for the consolidations, which are possible without migration. When consolidations without migration are not possible, based on the sizes of the shipments to be deposited and the sizes of the shipments already stored, the control unit verifies in which larger compartments the migrations and consolidations can take place and plans for the consolidations with migration. Depending on the accuracy level of the shipments sizes initially entered, some incertitude factors on the sizes may need to be taken into account during the estimations performed by the control unit. In addition to optimizing the compartments usage, the consolidation and migration processes simplify the shipment pick-up by the receiver as it minimizes the number of compartments that he has to open, eventually consolidating all the shipments that the receiver has to pick-up into only one compartment. Additionally, when some overdue shipments to be collected by the carrier agent are intended to the same receiver as some new shipments to be deposited by the carrier agent, the shipments due to be collected are not removed from the parcel locker, but are consolidated with the new shipments as long as the consolidation does not use more compartments than the new shipments alone would use. Based on the new shipment identifiers captured by the RFID area system, the control unit compares the receivers identifiers of the shipments brought for deposit with the receivers of the shipments due to be collected from the parcel locker. When the control unit identifies some receiver match between the shipments due to be collected and the shipments for deposit, the control unit defines the shipments consolidations, which have to take place, and identifies in which compartments these consolidations must take place based on the compartments mapping of the parcel locker and on the sizes of the shipments.

In order to minimize the carrier agent travel for the shipments deposit and collection, the compartments involved in the deposit need to be chosen so that the compartments involved in the deposit and collection can be concentrated in an optimized zoning of the parcel locker. Based on the compartments mapping of the parcel locker, the control unit identifies the empty compartments. Then, based on the sizes of the shipments to be deposited and on the required shipments collection, the control unit optimizes the consolidations and migrations so as to minimize the zone where the shipments deposit and collection take place. Additionally, in case different compartments have to be used for the same receiver because all the shipments intended to that receiver cannot fit in only one compartment, the control unit defines compartments, which are as near as possible, so as to facilitate the shipments pick-up by the receiver. As a result of the optimized zoning, the control unit defines which shipments need to be collected and in which compartment each shipment brought by the carrier agent must be deposited, as well as the associated consolidations and migrations, which need to take place. In a preferred embodiment, the optimized zoning also integrates additional constraints regarding the receivers' profiles or the carrier agents' profiles. Receivers' profiles are associated with shipment identifiers and carrier agents profiles are associated with carrier agents identifiers. A receiver profile may exclude the usage of some compartments for the shipments. For example, a handicapped profile for a receiver guarantees the deposit in the medium height of the parcel locker. Similarly, for profiles for small carrier agents, the deposit in compartments in the upper part of the parcel locker is excluded by the control unit, and the collection from compartments in the upper part of the parcel locker is not delayed by the control unit until a taller carrier agent comes by. In a preferred embodiment of the invention, the shipments addressed to several recipients can be consolidated so that a unique shipments receiver mandated by these different recipients picks-up these consolidated shipments and distributes then to the group of recipients. Such a consolidation of recipients can correspond to a group of friends who agree to share the burden of picking-up shipments in a parcel locker or to a service offered by an organisation performing shipment pick-ups from parcel lockers and the last mile distribution. In this preferred embodiment, the recipients consolidation can be performed for example in the remote shipping system 106 based on a mandate provided by the group of recipients. This consolidation and associated mandate can apply for only one pick-up or for a pre-agreed time period for pick-ups.

In summary, based on the compartments mapping of the parcel locker and on the new shipment identifiers captured by the RFID area system, and depending on the corresponding receivers and eventually depending on the carrier agent profile, the control unit establishes a deposit/collection plan, which defines in which compartment each shipment brought by the carrier agent must be deposited, and which also defines the collections and migrations, which need to take place. It is easily devised by those ordinary skilled in the art that the control unit or at least some of the functions performed by the control unit can also be remotely located, for example in the remote shipping system 106, rather than in the parcel locker 100, and be accessed to by the parcel locker on demand, for example via the long distance communication network 108.

Figure 2:
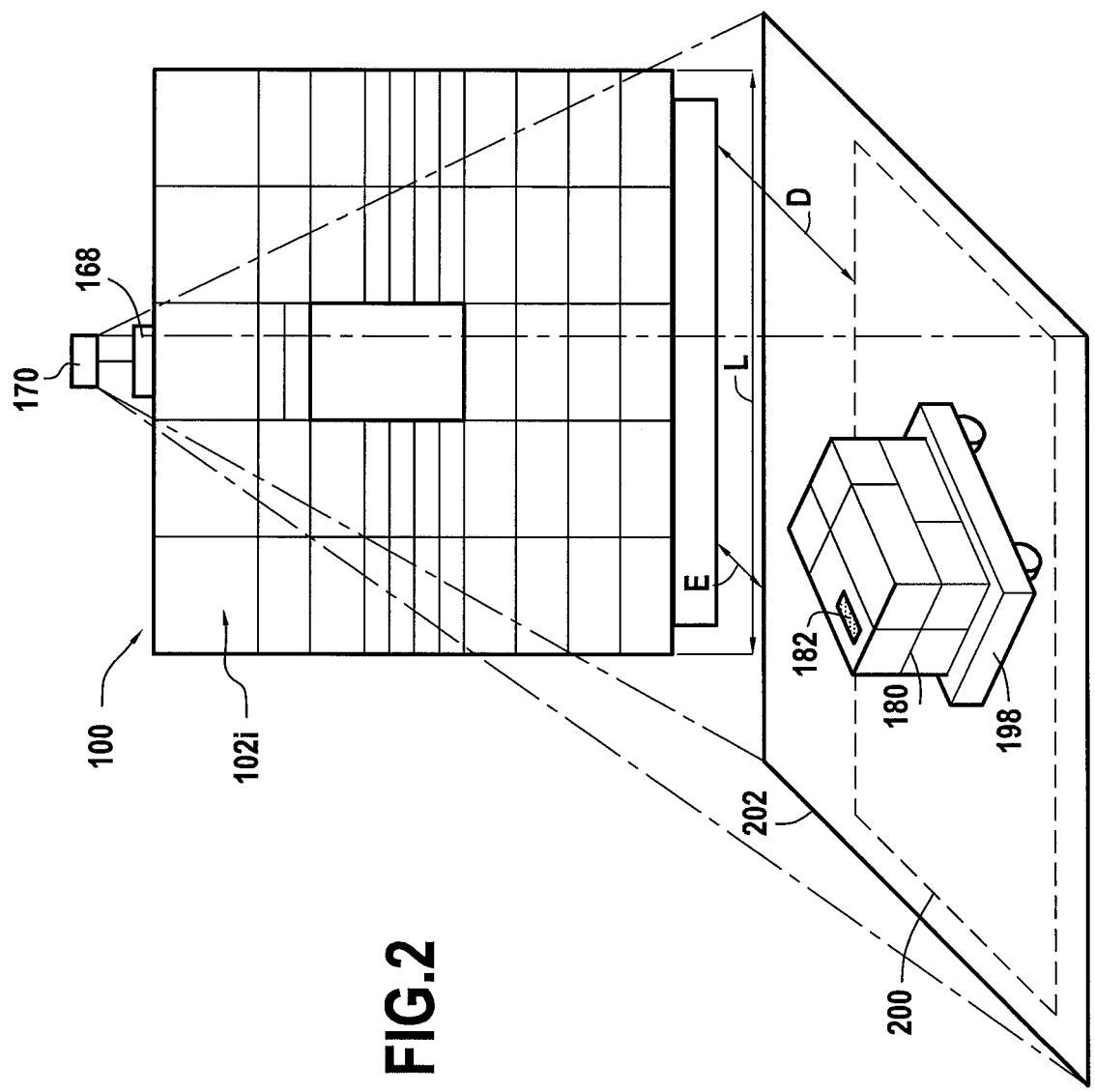
FIG. 2 illustrates the unloading zone and the detection area covered by the UHF RFID area system.

When the carrier agent has to deposit some shipments into a parcel locker 100, he usually transports the shipments with some carrying means such as a bag or a trolley 198 as illustrated on FIG. 2. When the carrier agent arrives for depositing shipments, he leaves the carrying means containing the shipments for deposit on an unloading zone 200 in front of the parcel locker. This unloading zone is located away from the parcel locker so that the parcel locker doors can be conveniently opened. The distance D from the parcel locker to the unloading zone is about 75 cm, and within the range 50 cm to 100 cm. The detection area 202 covered by the RFID area system fully includes the unloading zone 200 and extends towards the parcel locker up to the parcel locker or within a maximum distance E of about 10 cm from the parcel locker. When the carrier agent takes the shipment 180 identified by a UHF RFID tag 182 and moves it away from the carrying means, the RFID area system detects that the UHF RFID tag 182 affixed onto the shipment 180 is moving compared to the UHF RFID tags of the other shipments laying in the carrying means. Preferably, the movement detection of the UHF RFID tag 182 results from the compared analysis, which is performed by the control unit, of the phases of the signals emitted by the different UHF RFID tags. The time evolution of the phase of the moving tag 182 signal is singled out of the time evolutions of the phase signals from the other UHF RFID tags. The phase evolution analysis is preferably correlated with an analysis of the signal intensities of the tags so as to increase the tag movement detection accuracy. Some RFID readers can also provide the tag phase variation in addition to the tag signal intensity and the tag phase, therefore facilitating the tag movement detection by the control unit. Alternatively, the movement of the UHF RFID tag 182 can be detected by analysing the Fourier transform of the UHF RFID tag 182 signal. Based on the movement detection of the UHF RFID tag 182, the corresponding shipment is identified by the control unit, which then controls the opening of the appropriate compartment door, or doors in case of consolidation with migration, according to the deposit/collection plan established by the control unit.

Usually, the RFID area system stops reading UHF RFID tags after pre-determined delay without any response from any tag, typically after a 30 seconds delay. This pre-determined delay can be adjusted. So, the RFID area system may have stopped reading UHF RFID tags when a carrier agent or any user of the parcel locker arrives near the parcel locker. Therefore, the parcel locker user communication means provides a means for activating the RFID reading functionality of the RFID area system, which can be a button on the parcel locker interface or on the user mobile device. Preferably, the user is informed by the parcel locker user communication means whether the RFID area system is active for reading UHF RFID tags, and if the RFID reading is not active, then the user is prompted for activating the RFID reading functionality of the RFID area system.

In a preferred embodiment, based on the optimized zoning performed by the parcel locker system, the carrier agent is informed via the parcel locker user communication means where to leave the carrying means within the unloading zone 200 so as to perform the shipments deposit and collection from the most convenient location. Preferably, during the deposit and collection process, if at some point the order chosen by the carrier agent for depositing shipments compromises the deposit/collection plan established by the control unit, the parcel locker user communication means alerts the carrier agent that he should take another shipment for deposit and eventually advises him on which shipment to deposit next.

Depending on the length L of the parcel locker, the RFID area system can comprise several antennas 170, for detecting RFID tags within a detection volume covering the overall RFID detection area 202 including the unloading zone 200. Preferably, these several antennas of the RFID area system are operated by a single UHF RFID reader with several parallel RFID inputs-outputs and/or via a multiplexer or a directional coupler. When the RFID area system comprises several antennas 170, the movement detection of a RFID tag can be more accurately established within the volumes covered by at least two antennas, whose compared signals analysis teaches about a tag movement. All the different movement detection techniques based on UHF RFID antennas and readers such as tag phase analysis or tag signal Fourier analysis or multi-antenna tag signal analysis can be combined to improve detection accuracy.

When a shipment is deposited in a compartment of the parcel locker, the RFID tag attached to the shipment is detected and read by the UHF RFID compartment system integrated in the compartment. A parcel locker usually is constituted of compartments with metallic walls and a metallic door, and which have a common depth and some common widths, and often only one common width. The usual width of the compartments is between 10 cm and 45 cm, and typically around 40 cm, and the depth of the compartments is approximately between 40 cm and 60 cm. The different sizes of the parcel locker compartments correspond to different compartment heights, which are comprised approximately between 10 cm and 40 cm. As known by those skilled in the art, radiative UHF RFID waves, generated by standard RFID UHF antennas, cannot propagate correctly within an electrically conductive cavity, if the volume of the cavity is too small. One of the cavity dimension must be at least three times longer than the UHF wavelength. As the UHF RFID standards are limited in Europe to a narrow band 866-869 MHz and in USA to a narrow band 902-928 MHz, the UHF wavelengths to be considered are about 34 cm in Europe and 32 cm in US. For parcel locker, the maximum dimension of a compartment is typically its depth, with a maximum value of 60 cm. So, the UHF RFID compartment system of the invention is designed for operating within an electrically conductive compartment, whose maximum dimension is below twice the UHF wavelength. In a preferred embodiment, the antenna component of the UHF RFID compartment system is constituted with a conductive line positioned within the compartment near and along one of the compartment walls. Preferably, the conductive line is positioned along the longest dimension of the compartment and near the compartment wall whose area is the largest, which typically corresponds to the bottom wall of the compartment. The conductive line is connected to this nearest wall of the electrically conductive compartment, which serves as a ground surface. The conductive line behaves as a wire wave guide, which generates a localized propagating EM field in the vicinity of the conductive line. The electric field lines are directed from the conductive line towards the ground surface. The introduction of a conductive line within the electrically conductive compartment as described above ensures the propagation of a non-radiative evanescent UHF EM wave along the conductive line within the compartment.

Any conductive line shape could be used as a wire wave guide to generate a non-radiative propagating evanescent EM field, including a serpentine shape. For design and industrial simplicity, a straight line shape is preferred for the conductive line. Preferably, the conductive line is composed of two straight conductors made of discontinued conductive segments positioned side by side so that the conductor discontinuities are distributed alternatively along the two straight conductors. Each straight conductor composing the conductive conductor of the wire wave guide includes at its extremity an end segment whose length is half the length of the other segments in order to ensure the alternation of the discontinuities respectively along each of the two straight conductors. The end segments can also be positioned at the two extremities of only one of the two straight conductors. Such a structure improves the conductive line efficiency and ensures the re-phasing of the line. In the case of the UHF RFID band for Europe, the length of each segment is within the range 42 mm to 46 mm and preferably: 44 mm and the length of the conductor discontinuities is preferably 1 mm. Preferably, the conductive line is made of copper or aluminum. In a preferred embodiment, micro-strip technology is used for manufacturing the wire wave guide, i.e. the electrical transmission lines are fabricated using printed circuit board technology. Typically, copper lines are drawn on insulating supports such as composite epoxy materials or laminates made of layers of cloth or paper with thermo-set resin. The thickness of the micro-strip support is within the range 0.5 mm to 2 mm and preferably: 1.6 mm. The conductive line is held inside the electrically conductive compartment above the bottom electrically conductive wall of the compartment at a distance within the range 2 mm to 4 mm and preferably: 3 mm. Preferably, the conductive line is centered above the electrically conductive bottom wall along the longest dimension of the bottom wall.

In order to avoid reflections of the propagating wave, the conductive line, which is fed directly via a current input, is terminated by a load. This load disperses the electromagnetic energy conveyed by the conductive line, and thus avoids the establishment of stationary modes along the conductive line. If stationary waves were established, the resulting EM field would not be appropriate for communicating with RFID tags as the EM field profile would include peaks and valleys (i.e. nodes). RFID tags positioned at a node would be unlikely to be detected in general. The establishment of a propagating wave avoids the establishment of nodes of stationary wave, and ensures that UHF RFID tags can be detected anywhere along the conductive line. Moreover, the reflections, which are at the origin of the stationary waves, could deteriorate the UHF RFID reader. The addition of a load at the end of the wire wave guide prevents reflections, which could damage the UHF RFID reader. In a preferred embodiment, the UHF RFID signal generated by the UHF RFID reader is fed via the current input into an entry extremity of the conductive line. The connection of the current input on the entry extremity of the conductive line is performed on the entry end segment of the conductive line. The load is connected for one of its electrical terminations to the exit extremity of the conductive line, which is the extremity opposite to the entry extremity of the conductive line. The connection of the load on the exit extremity of the conductive line is performed on the exit end segment of the conductive line. The load is connected for its other electrical termination to the electrically conductive surface, which serves as a ground surface. Preferably, a load of 50 ohm connects the end of the conductive line with the ground surface.

The efficiency of the wire wave guide system is improved by using two conductive lines positioned in parallel above the bottom electrically conductive wall of the compartment.

These two conductive lines are fed via a current input and constitute a two-lines wire wave guide. This system of two parallel conductive lines is designed so that the current in the two conductive lines are in phase opposition, resulting in a constructive addition of the evanescent EM fields of the two conductive lines in the volume between these two conductive lines above the bottom electrically conductive wall. The phase opposition is obtained by feeding a first conductive line via a feed line, which is a half wavelength longer than the feed line of the second conductive line. This half wavelength additional length inverts the current phase in the second conductive line compared to the current phase in the first conductive line. Thanks to this inversion, the evanescent EM fields generated by the two wire wave guides are constructively added. The resulting evanescent EM field of these two parallel conductive lines is about twice more intense than the evanescent EM field generated by a single conductive line. In order to avoid reflections of the propagating wave in the compartment, each conductive line is terminated by a load. In a preferred embodiment, the feed lines are fed with the UHF RFID signal generated by the UHF RFID reader via the current input into an entry extremity of the wire wave guide. The connection of the current input on the entry extremity of the wire wave guide is performed on one extremity of one of the two feed lines. The other extremity of each feed line is connected to a load. Each of these two loads is connected for one of its electrical terminations to the exit extremity of one of the two conductive lines. Each of the two loads is connected on its other electrical termination to the compartment bottom wall, which serves as a ground surface.

Preferably, each conductive line is ended by a 100 ohm resistor load connected to the bottom wall of the compartment.

FIG. 3 illustrates the electromagnetic (EM) fields in an electrically conductive compartment 300 with a rectangular section generated by two parallel conductive lines 302 and 304 within the electrically conductive compartment. Each conductive line 302 or 304 is positioned on the non-conductive plate 306 so that they are positioned from the vertical electrically conductive walls of the compartment respectively 312 or 314 at a distance within the range 2 mm to 4 mm and preferably: 3 mm. Depending on the width of the compartment, the distance between the two parallel conductive lines is within the range 10 cm to 30 cm. Due to the designed configuration described above of the two lines wire guide, the resulting evanescent EM field generated by the two conductive lines is established into the compartment and interacts with the electrically conductive walls of the compartment so that the magnetic field B is primarily in a direction perpendicular to the plane defined by the two parallel conductive lines 302 and 304. The currents in the conductive lines 302 and 304 are in phase opposition, and are conventionally represented by a dot (.) and a cross (x) on FIG. 3.

For typical UHF RFID readers currently available on the market with power output in the range 1 W to 4 W, communication with typical UHF RFID tags currently available on the market can be established within a distance of about 10 cm to 15 cm from a single conductive line composed of two straight conductors made of discontinued conductive segments as described above. A configuration with two conductive lines positioned in parallel as described above can be used with compartments whose section (height×width) can be up to 15 cm×30 cm. The depth of the compartment can be up to about 100 cm before EM energy loss along the wire wave guide is too important, and therefore such wire wave guides are particularly appropriate for parcel locker compartments whose depth is 40 cm to 60 cm. The wire wave guides are preferably positioned near the bottom wall of a compartment because, statistically, the RFID tags affixed to shipments are more likely to be located in the bottom half of the compartment. However, the wire wave guides can also be positioned near any of the electrically conductive walls of the parcel locker compartment.

Figure 5:
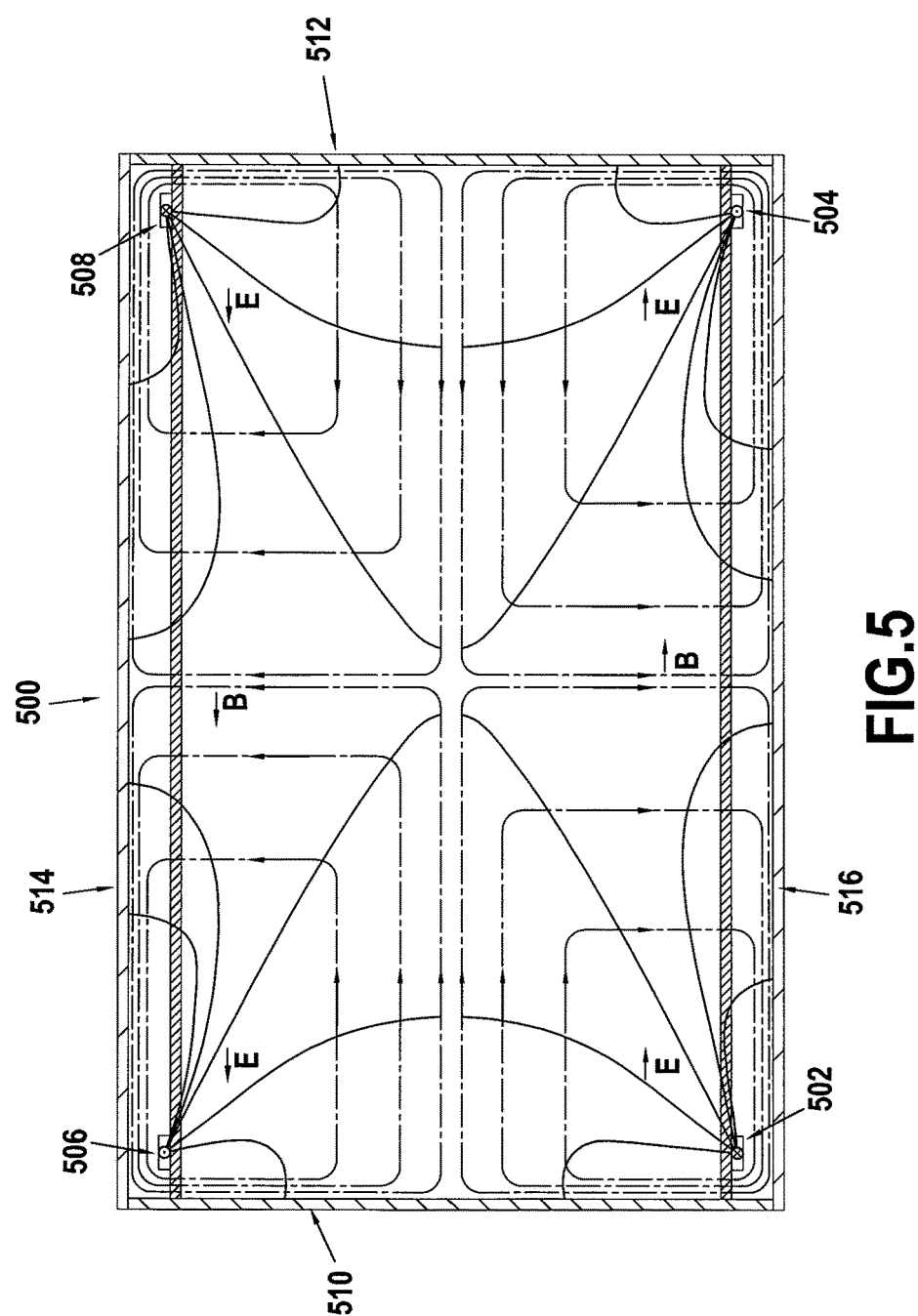
FIG. 5 illustrates an addition of a two-lines wire wave guide near the top wall of a compartment in addition to a two-lines wire wave guide positioned near the bottom wall of the compartment.

For a parcel locker compartment, which is wider than 30 cm, several two-lines wire wave guides can be assembled in parallel side by side near the bottom wall 410 of a compartment. FIG. 4 illustrates a parallel assembly of two two-lines wire wave guides near the bottom wall of a compartment 400, each two-lines wire wave including two lines 402 and 404, or 406 and 408. The two nearest lines 404 and 406 of the two-lines wire wave guides put in parallel need to be fed so that their electrical currents are in phase. To ensure that the nearest lines 404 and 406 are in phase, the line 406 can be connected in series with the line 404 via a half wavelength connection. The lines 402 and 408 can be connected in a similar manner. For a parcel locker compartment, which is higher than 15 cm, two-lines wire wave guides can be introduced near the top electrically conductive wall of the compartment in addition to the two-lines wire wave guides positioned near the bottom wall of the compartment. FIG. 5 illustrates an addition of a two-lines wire wave guide near the top wall of a compartment 500 in addition to a two-lines wire wave guide positioned near the bottom wall of the compartment. Each two-lines wire wave includes two lines 502 and 504, or 506 and 508. In order to further improve the reading capability of a UHF RFID compartment system, additional two-lines wire wave guides (not illustrated), eventually assembled in parallel side by side, can be attached near the two side walls 510 and 512 of a compartment in addition to the two-lines wire wave guides positioned near the top wall 514 and near the bottom wall 516 of the compartment.

The configuration of RFID wire guides installed in each electrically conductive compartment provides a low cost antenna-like solution for communicating with RFID tags affixed to shipments deposited in the parcel locker and allows combining the non-radiative behavior of the RFID wire guide with the Faraday cage effect of metallic compartments, therefore confining the UHF signal within each compartment, and preventing UHF leakages from the compartments. In the case of parcel lockers with non-conductive compartment walls, one wall in each compartment would have to be at least partially coated or dressed with an electrically conductive material in order to serve as a ground surface for the wire wave guide. Preferably, the largest wall of the compartment is used as the ground surface, and conveniently, this is generally the bottom wall of the compartment. The UHF EM field generated by the wire wave guide remains primarily localized near the wire wave guide, radiating from the conductive lines of the wire wave guide towards the ground surface. Thus, the EM radiation leaking outside the compartment is limited and tagged shipments near the parcel locker are typically not detected. Preferably, the other walls of the compartments as well as the compartment door are also covered or dressed with electrically conductive materials so that the interaction of the wire wave guide with the compartment walls confines the UHF EM generated by the wire wave guide within the compartment. Such a low cost RFID wire guide solution allows for an effective validation of tagged shipments deposited in or collected from the parcel locker, therefore avoiding any of the errors occurring with current parcel lockers. It also allows for the associations between the compartments 102i of the parcel locker and the identifiers of the shipments deposited in the parcel locker. These associations are stored in the Compartments mapping table 156 of the memory storage 150 by the control unit.

Figure 6:
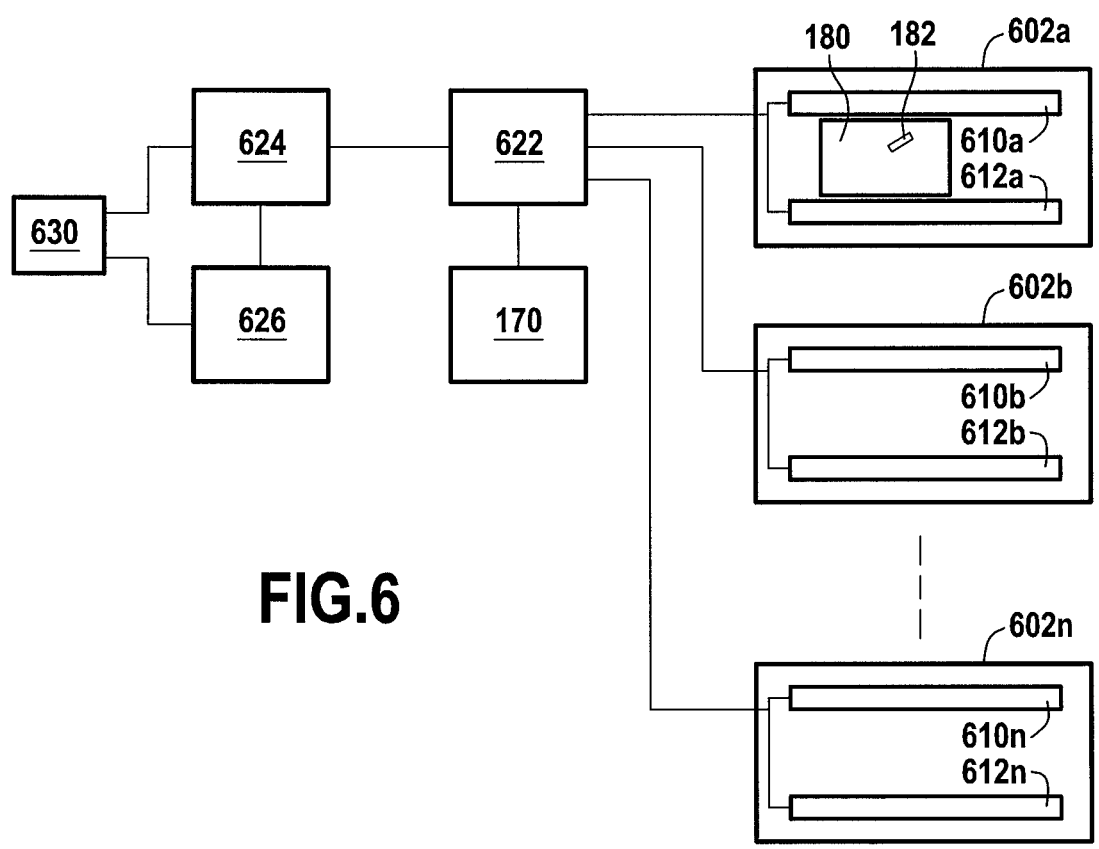
FIG. 6 represents a UHF RFID system for a parcel locker having an RFID area system and integrating in each compartment a RFID compartment system.

FIG. 6 represents a UHF RFID system for a parcel locker with several compartments where UHF RFID tags 182 of shipments 180 need to be detected and need to communicate with the UHF RFID reader. Each of the compartments 602a to 602n of the parcel locker is equipped with a RFID compartment system for reading UHF RFID tags affixed onto shipments. The RFID compartment systems can for example be wire wave guides composed of a combination of two parallel conductive lines 610a and 612a to 610n and 612n, which are installed above the bottom wall of each compartment. The RFID compartment systems are connected to UHF RFID reader via a channel gatherer 622 such as preferably a multiplexer or a directional coupler. Depending on the number of RFID compartment systems, several multiplexers can be connected in parallel on the parallel RFID inputs-outputs of the UHF RFID reader 624 or on a first stage multiplexer connected to the UHF RFID reader 624. On FIG. 6, a UHF RFID reader 624 is connected to the multiplexer 622 and to a controller 626, which collects the UHF RFID tags data of the tags 182 of the shipments 180 detected by the UHF RFID reader and which manages the communication of this data. In a simpler architectural embodiment, the controller 626 is the parcel locker control unit 104. Power is provided to the UHF RFID reader and to the controller by a power supply 630. In a minimal configuration, the UHF RFID reader 624 is also used for operating the at least one antenna 170 of the RFID area system via the multiplexer 622. However, to improve the RFID system performances, the RFID area system and the RFID compartment systems can have two separate UHF RFID readers, both connected to the controller managing the data from both the UHF RFID readers or eventually more parallel UHF RFID readers.

The advantages of using a RFID system for parcel lockers combining a RFID area system and RFID compartment systems integrated in each compartment are multiple as it allows for shipments consolidation during the deposit and collection therefore freeing space for more deposits and avoiding collecting shipments, which can be consolidated with new shipments for deposit for the same receiver; it allows for automated identification without any manual scan or any manual compartment size selection by carrier agent or user (receiver/sender) by reading information in the RFID tags attached to the shipments; it allows for optimized zoning for shipment deposit to minimize carrier agent or receiver movements; and it allows automatic opening of appropriate compartments to guide the user and automatic validation of his actions.

Figure 7B:
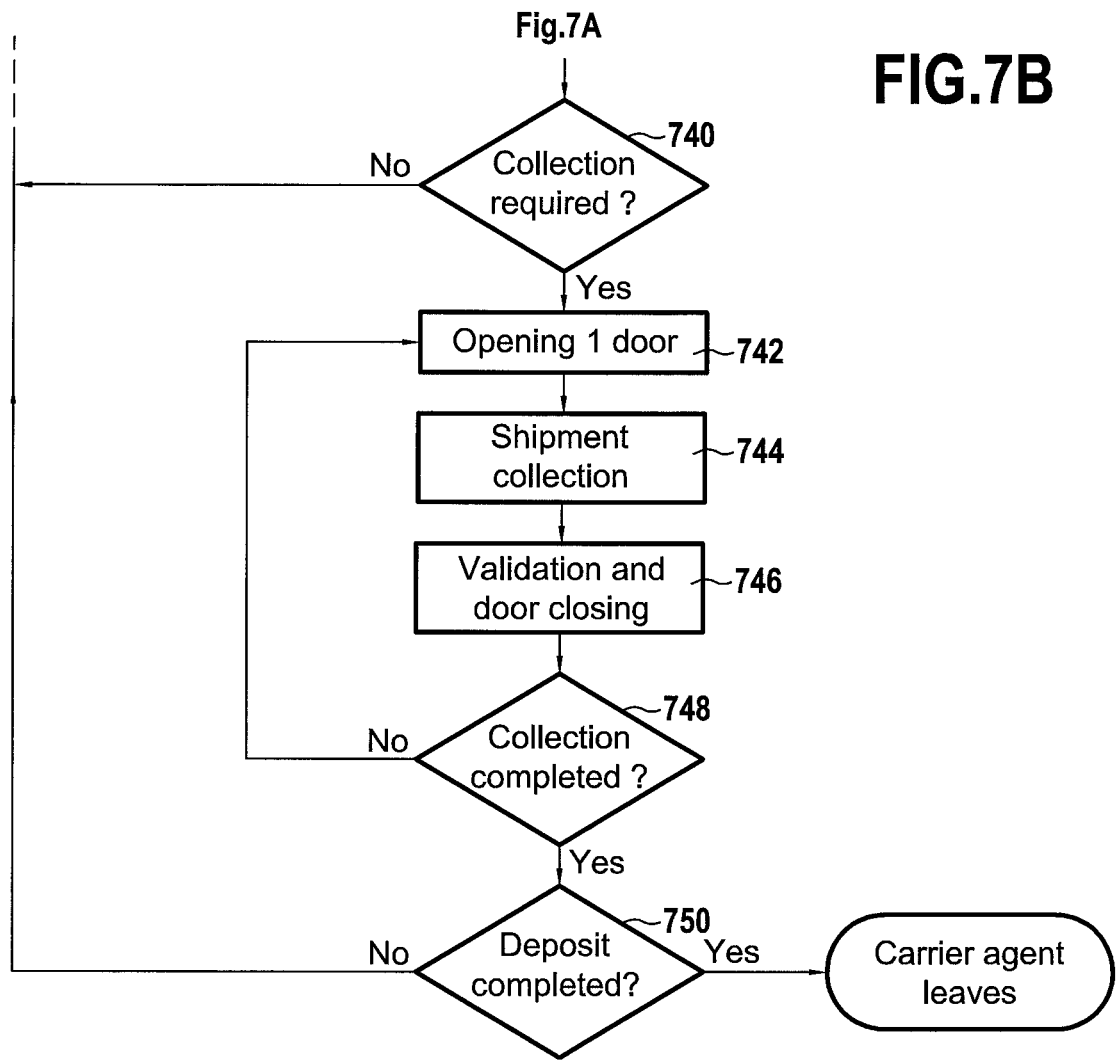

FIGS. 7A and 7B illustrate how shipments are deposited and collected by a carrier agent according to the invention. When the carrier agent arrives for depositing and collecting shipments, he transports the shipments for deposit with some carrying means such as a bag or a trolley and enters the unloading zone 200 in front of the parcel locker. If the RFID area system for reading tags in front of the parcel locker is inactive when the carrier agent arrives near the parcel locker, the carrier agent activates the RFID area system with a means such as a button on the parcel locker interface or on the carrier agent mobile device (act 702). In a preferred embodiment, the UHF RFID carrier agent information, including the carrier agent identifier, held by the carrier agent is read by the RFID area system so as to provide him access to the parcel locker (act 704). The information in the UHF RFID tags affixed onto the shipments brought for deposit by the carrier agent is read by the RFID area system including the shipment identifiers and eventually the sizes of the shipments or the identifiers of the receiver of the shipments or the receivers' profiles (act 706). Based on the shipment identifiers, the size of the shipments or the identifiers of the receivers of the shipments or the receivers' profiles can also be retrieved from the data transferred to the parcel locker from the remote shipping system (act 708). The reading by the RFID area system of the carrier agent information or of the tags affixed onto the shipments can be performed in any order.

In act 710, the control unit establishes the optimized zoning for the carrier agent deposit and collection and plans the consolidations and migrations. Based on the shipment identifiers captured by the RFID area system and based on the sizes of the shipments to be deposited, the control unit defines the shipments consolidations, which have to take place, identifies in which compartments these consolidations must take place based on the compartments mapping of the parcel locker, and plans for the consolidations, which are possible without migration. For consolidations, which are not possible without migration, based on the sizes of the shipments to be deposited and the sizes of the shipments already stored, the control unit verifies in which larger compartments the migrations and consolidations can take place, and plans for the consolidations with migration. The planning for the consolidations and migrations also includes the shipments due to be collected by the carrier agent. The optimization performed by the control unit of the parcel locker in terms of optimized zoning and compartment space optimization integrates the following rules. In order to minimize the carrier agent travel for the deposit and collection, the compartments involved in the deposit and collection are concentrated in a spatially minimized zone of the parcel locker. A shipment deposit, eventually including a consolidation, is allowed only in compartments corresponding to the smallest size possible for the size of that shipment. When different compartments have to be used for the same receiver because all the shipments intended to that receiver cannot fit in only one compartment, the control unit defines compartments, which are as near as possible, so as to facilitate the shipments pick-up by the receiver. Consolidation for the same receiver is performed in only one compartment within the limit of the compartment maximum size until a migration is required to a bigger compartment to be able to complete consolidation. Priority is given to new deposits over overdue shipments, which may be consolidated, and therefore when a carrier agent performs a collection/deposit, if for a same receiver there are both shipments to be collected and new shipments to be deposited, the shipments to be collected remain in the parcel locker and are consolidated with the new shipments to be deposited as long as there is enough space for all the new deposits. Preferably, because a migration is a more complex operation, a migration takes place only if it is required for allowing an additional new deposit in the parcel locker. In a preferred embodiment, based on the optimized zoning performed by the parcel locker system, the carrier agent is informed via the parcel locker user communication means where to leave the carrying means within the unloading zone 200 so as to perform the shipments deposit and collection from the most convenient location (act 712). When the carrier agent takes a shipment for depositing it in the parcel locker, the RFID area system automatically detects and reads the UHF RFID tag affixed onto the shipment and the shipment is identified by the control unit (act 714), which then, according to the deposit/collection plan established by the control unit, controls the opening of one compartment door in case of simple deposit in an empty compartment or of consolidation without migration, or of two compartment doors in case of consolidation with migration (act 716). If the size of the shipment taken by the carrier agent is not accessible for the parcel locker, for example because it is missing or not readable, the parcel locker user communication means requests the entry of the shipment size from the user.

When no migration is required, the control unit opens one door corresponding to an empty compartment in case of a simple deposit without consolidation or corresponding to a compartment already containing shipments intended to the same receiver as the receiver of the shipment being deposited by the carrier agent in case of a deposit with consolidation (act 718). The carrier agent deposits the shipment in the opened compartment. The RFID compartment system automatically detects and reads the UHF RFID tag affixed onto the shipment and the shipment is identified by the control unit (act 720). The control unit validates the deposit and in particular verifies that the size of the compartment is appropriate for the shipment size or that, in case of consolidation, the receiver is the same for all the shipments deposited in the compartment. If the deposit is not validated by the control unit, the parcel locker user communication means alerts the carrier agent regarding the invalid situation and guides the agent for resolving the invalid situation, and the compartment door remains opened until the situation is resolved. If the deposit is validated by the control unit, preferably the parcel locker user communication means informs the carrier agent regarding the valid situation and the compartment door is closed, either automatically or by the carrier agent (act 722).

When a migration is required, the control unit opens two compartment doors. One door corresponds to a larger empty compartment in which the shipments migration is due to take place. The second door corresponds to a compartment already containing shipments intended to the same receiver as the receiver of the shipment being deposited by the carrier agent (act 730). The carrier agent deposits the shipment, which he has taken for deposit, in the larger empty compartment (act 732). Then, the carrier agent takes the shipments from the second compartment and migrates them to the larger compartment where he has just deposited the shipment he had brought for deposit. The RFID compartment system automatically detects and reads the UHF RFID tags affixed onto the shipments deposited in the large compartment used for the migration and the shipments are identified by the control unit (act 734). The RFID compartment system also automatically detects that there are no more shipment UHF RFID tag in the compartment from which shipments were to be removed for migration. The control unit validates the migration, i.e. both the deposit and the removal of shipments, and in particular verifies that the size of the compartment is appropriate for the shipments sizes or that the receiver is the same for all the shipments deposited or migrated in the compartment. If the migration is not validated by the control unit, the parcel locker user communication means alerts the carrier agent regarding the invalid situation and guides the agent for resolving the invalid situation, and the compartment doors remain opened until the situation is resolved. If the migration is validated by the control unit, preferably the parcel locker user communication means informs the carrier agent regarding the valid situation and the two compartment doors are closed, either automatically or by the carrier agent (act 736).

Each time the carrier agent takes a new shipment for depositing it in the parcel locker, the deposit process resumes from act 714. Once all deposits are performed or in case necessary compartments are filled before the end of deposit, then the collection of overdue shipments is initiated. The parcel locker user communication means informs the carrier agent that collection is required for freeing compartments in the parcel locker (act 740). The control unit opens a door corresponding to a compartment containing overdue shipments, which are not planned to be consolidated (act 742). The carrier agent collects the shipments from the opened compartment (act 744). The RFID compartment system automatically detects that there are no more shipment UHF RFID tags in the compartment from which shipments were collected and the control unit validates the collection. If the collection is not validated by the control unit, the parcel locker user communication means alerts the carrier agent regarding the invalid situation and guides the agent for resolving the invalid situation, and the compartment door remains opened until the situation is resolved. If the collection is validated by the control unit, preferably the parcel locker user communication means informs the carrier agent regarding the valid situation and the compartment door is closed, either automatically or by the carrier agent (act 746). As long as shipments are still required to be collected, preferably the parcel locker user communication means informs the carrier agent that shipments still need to be collected, and the collection process resumes from act 742 (act 748). Once the collection of all the shipments due to be collected is completed, the parcel locker user communication means informs the carrier agent that the collection is completed, and if some shipments remain to be deposited, preferably the parcel locker user communication means informs the carrier agent that he can resume the deposit, and following on a new shipment being taken by the carrier agent the deposit process resumes from act 714, otherwise the deposit/collection process is completed and the carrier agent leaves with the collected shipments (act 750).

After any collection or deposit with or without consolidation or migration, the general rule carried out by the control unit is that all doors are closed before any other action can take place, and the next door opening guides the carrier agent for his next deposit or collection. Although it may be more convenient for the carrier agent to start depositing the shipments that he brings with him before collecting because this way he limits the number of shipments that he has on hand, the parcel locker system of the invention can be flexible for handling deposits and collections in any preferred order. This flexibility is secured by the capability of the parcel locker system of the invention to validate each shipment deposit or collection thanks to its RFID reading systems, which for example can ensure that a collected shipment is not re-deposited later on.

Preferably, during the deposit and collection process, if at some point the order chosen by the carrier agent for depositing shipments compromises the deposit/collection plan established by the control unit, the parcel locker user communication means alerts the carrier agent that he should take another shipment for deposit and eventually advises him on which shipment to deposit next. Once the deposit/collection process by the carrier agent is completed and the latest open compartment door is closed, the parcel locker control unit registers the new deposits, the shipment removals and the consolidations and migrations, as well as the associated data such as the shipment sizes or receivers identifiers, and the control unit stores a new compartments mapping.

Figure 8:
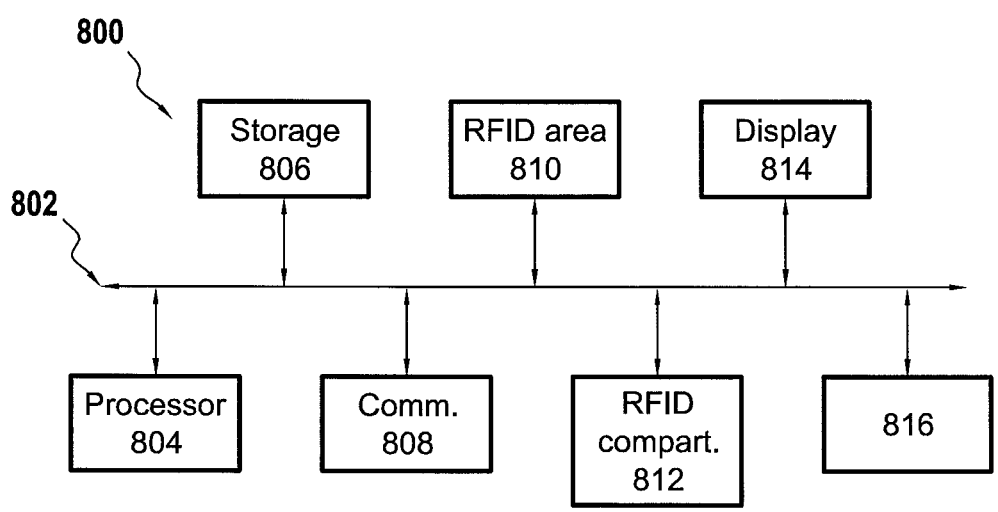
FIG. 8 illustrates a schematic representation of an example computer system suitable for implementing embodiments of the invention.

FIG. 8 shows a schematic representation of an example computer system 800 suitable for implementing embodiments of the invention. The computer 800 includes a bus 802, which connects major components of the computer system 800, such as a processor 804, one or more memory storage components 806 such as RAM, ROM, flash RAM, hard drive, flash drive, or the like and a communication interface 808 for long distance communication such as an Ethernet, Internet, wide area network, or similar connection. The RFID area system 810 and the RFID compartment systems 812 are also connected to the bus. Additional components can also be connected to bus 802 as part of the parcel locker user communication means, such as a display 814 for example a touchscreen, with eventually a keyboard, or such as loud speakers or microphones or cameras 816.

The bus 802 allows data communication between the processor 804 and the different components connected to the bus. In a simpler architectural embodiment, the processor 804 corresponds to parcel locker control unit 104, which controls the different components connected to the bus. However, more generally, several different controllers may interact in the controlling of the parcel locker operation. The bus 802 allows data communication between the processor 804 and the memory storage 806. The memory storage comprises, for example, the memory storage 150 including the Shipment identifiers and associated data table 152 or the Compartments mapping table 156, and further includes generally the main memory into which an operating system and application programs are loaded. The memory storage also can contain, among other codes, software which controls basic hardware operation of the system, such as interactions with peripheral components. The cryptographic module 192 for interpreting the user identifier is typically stored in the memory storage 806.

Additional components may be included in the computer system 800 as will be understood by a person skilled in the art; conversely, all of the components shown in FIG. 8 need not be present to practice the invention. The components can be interconnected in different ways from that shown. The operation of a computer such as that shown in FIG. 8 is readily known in the art and is not discussed in detail in this application.

The above description primarily focused on operating a single parcel locker, but it will be understood by those skilled in the art that the invention also applies to several parcel lockers operating in a network. In particular, if several parcel lockers are installed within the same perimeter, these parcel lockers can be managed as only one parcel locker with a combined compartments mapping, and a carrier agent can operate them as a group.

Although the embodiments of the invention covered in the patent description apply for parcel lockers, it is to be understood that the invention is not limited to the disclosed embodiments, but can be applied to any electronic storage system.

The invention claimed is:

1. An electronic parcel locker system for shipments delivery and pick-up, comprising at least one electronic parcel locker having compartments for storing shipments, said electronic parcel locker system further comprising an RFID area system comprising an RFID reader and at least one antenna for reading tags affixed onto shipments brought in a detection area to be deposited in said compartments and at least one RFID compartment system integrated in each of said compartments for reading tags affixed onto shipments deposited in said compartments, wherein said at least one electronic parcel locker comprises a control unit and each of said compartments comprises a door, and wherein said control unit is operable to electronically control said door and to open said door in response to a signal provided by said RFID area system resulting from said RFID area system identifying that a RFID tag affixed onto a determined shipment is moving compared to RFID tags of other shipments laying in said detection area, wherein each of said compartments has an internal volume wherein said RFID compartment system is configured to have a reading range covering said internal volume, wherein said internal volume has a maximum dimension and said RFID compartment system operates at an UHF wavelength and wherein said maximum dimension is below twice said UHF wavelength.

2. The system according to claim 1, further comprising a remote shipping system comprising a first cryptographic module, a second cryptographic module included in said at least one electronic locker, and a transmission network for exchanging encrypted data between said remote shipping system and said at least one electronic locker.

3. The system according to claim 1, wherein said control unit is included in said at least one electronic locker or is part or entirely located remotely from said at least one electronic locker.

4. A method for optimized zoning for deposit and collection and pick-up of shipments within at least one electronic parcel locker of an electronic parcel locker system according to claim 1, comprising:
    reading at least a shipment identifier in each tag affixed onto each shipment for deposit;
    identifying a size and a receiver identifier for each shipment for deposit based on said shipment identifier;
    comparing said receiver identifier with receiver identifiers of shipments deposited in said at least one electronic parcel locker;
    identifying compartments within said at least one electronic parcel locker for consolidation and for migration of shipments with a same receiver identifier based on sizes of shipments deposited in said at least one electronic parcel locker and based on the sizes of shipments for deposit so as to minimize the zone where the deposit and collection take place; and
    planning for deposit and for collection of shipments within said at least one electronic parcel locker based on identified compartments for consolidation and for migration and based on a compartments mapping table so as to minimize the zone where the deposit and collection take place.

5. The method for optimized zoning as claimed in claim 4, wherein, if shipments for a same receiver identifier do not fit in a compartment of said at least one electronic parcel locker, compartments planned to be used for said shipments corresponding to said same receiver identifier are defined as near as possible so as to facilitate shipments pick-up.

6. The method for optimized zoning as claimed in claim 4, wherein shipment identifiers of shipments deposited in a compartment of said at least one electronic parcel locker and sizes of said shipments and a receiver identifier of said shipments are stored in a shipment identifiers and associated data table, wherein said compartments mapping table associates said compartment with said shipment identifiers and with said sizes and with said receiver identifier.

7. A method for consolidating shipments within at least one electronic parcel locker of an electronic parcel locker system according to claim 1, comprising:
    comparing a receiver identifier of a shipment for deposit with receiver identifiers of shipments deposited in said at least one electronic parcel;

identifying a compartment for consolidation containing shipments with said receiver identifier of a shipment for deposit;

automatically opening a door of said compartment for consolidation;

depositing said shipment for deposit in said compartment for consolidation;

automatically reading a shipment identifier of a shipment deposited in said compartment for consolidation; and validating said shipment deposited in said compartment before closing said compartment door.

8. The method for consolidating shipments as claimed in claim 7, wherein said automatically opening a door is driven by the identification of a tag affixed onto a moving shipment by said RFID area system.

9. The method for consolidating shipments as claimed in claim 7, further comprising:

reading at least a shipment identifier in each tag affixed onto each shipment for deposit;

identifying a size and a receiver identifier for each shipment for deposit based on said shipment identifier;

comparing said receiver identifier with receiver identifiers of shipments deposited in said at least one electronic parcel locker;

identifying compartments within said at least one electronic parcel locker for consolidation and for migration of shipments with a same receiver identifier based on sizes of shipments deposited in said at least one electronic parcel locker and based on the sizes of shipments for deposit so as to minimize the zone where the deposit and collection take place; and planning for deposit and for collection of shipments within said at least one electronic parcel locker based on identified compartments for consolidation and for migration and based on said compartments mapping table so as to minimize the zone where the deposit and collection take place, wherein said identifying a compartment for consolidation is based on said identifying compartments within said at least one electronic parcel locker for consolidation and for migration of shipments with a same receiver identifier based on sizes of shipments deposited in said at least one electronic parcel locker and based on the sizes of shipments for deposit so as to minimize the zone where the deposit and collection take place.

10. A method for migrating shipments within at least one electronic parcel locker of an electronic parcel locker system according to claim 1, comprising:

comparing a receiver identifier of a shipment for deposit with receiver identifiers of shipments deposited in said at least one electronic parcel locker;

identifying a compartment containing shipments for migration with said receiver identifier of a shipment for deposit;

identifying a compartment for migration;

automatically opening a first door of said compartment containing shipments for migration; —automatically opening a second door of said compartment for migration;

removing said shipments for migration from said at least one electronic parcel locker and depositing them in said compartment for migration;

automatically reading shipment identifiers of shipments deposited in said compartment for migration; and validating migration of said shipments deposited in said compartment for migration before closing compartment first and second doors.

11. The method for migrating shipments as claimed in claim 10, wherein openings of said first door of said compartment containing shipments for migration and of said second door of said compartment for migration are driven by the identification of a tag affixed onto a moving shipment by said RFID area system.

12. The method for migrating shipments as claimed in claim 10, further comprising:

reading at least a shipment identifier in each tag affixed onto each shipment for deposit;

identifying a size and a receiver identifier for each shipment for deposit based on said shipment identifier;

comparing said receiver identifier with receiver identifiers of shipments deposited in said at least one electronic parcel locker;

identifying compartments within said at least one electronic parcel locker for consolidation and for migration of shipments with a same receiver identifier based on sizes of shipments deposited in said at least one electronic parcel locker and based on the sizes of shipments for deposit so as to minimize the zone where the deposit and collection take place; and planning for deposit and for collection of shipments within said at least one electronic parcel locker based on identified compartments for consolidation and for migration and based on said compartments mapping table so as to minimize the zone where the deposit and collection take place, wherein said identifying a compartment containing shipments for migration and said identifying a compartment for migration are based on said identifying compartments within said at least one electronic parcel locker for consolidation and for migration of shipments with a same receiver identifier based on sizes of shipments deposited in said at least one electronic parcel locker and based on the sizes of shipments for deposit so as to minimize the zone where the deposit and collection take place.

13. An electronic parcel locker system for shipments delivery and pick-up, comprising at least one electronic parcel locker having compartments for storing shipments, said electronic parcel locker system further comprising an RFID area system comprising an RFID reader and at least one antenna for reading tags affixed onto shipments brought in a detection area to be deposited in said compartments and at least one RFID compartment system integrated in each of said compartments for reading tags affixed onto shipments deposited in said compartments, wherein said at least one electronic parcel locker comprises a control unit and each of said compartments comprises a door, and wherein said control unit is operable to electronically control said door and to open said door in response to a signal provided by said RFID area system resulting from said RFID area system identifying that a RFID tag affixed onto a determined shipment is moving compared to RFID tags of other shipments laying in said detection area, wherein said RFID compartment system comprises a wire wave guide composed of two conductive lines positioned in parallel above a ground surface and generating a propagative non-radiating UHF electromagnetic wave along said conductive lines within said compartment, wherein each of said two conductive lines has an entry extremity connected to a feed line comprised in each of said two conductive lines and an exit extremity, wherein said exit extremity is connected to said ground surface via a load, and wherein a feed line of one of said two conductive lines is a half wave length longer than a feed line of the other of said two conductive lines.

14. The system according claim 13, wherein said RFID compartment system comprises several said wire wave guides assembled in parallel side by side.

15. The system according to claim 13, wherein each of said compartments further comprises side walls and in that said ground surface is one of said side walls.

16. The system according to claim 13, wherein each of said two conductive lines is composed of two straight conductors made of discontinued conductive segments positioned side by side so that the line discontinuities are distributed alternatively along said two straight conductors and with at the extremity of each of said two straight conductors an end segment whose length is half the length of the other said segments.

17. The system according to claim 13, wherein each of said two conductive lines are positioned at a distance above said ground surface within the range 2 mm to 4 mm and at a distance from compartment walls adjacent to said ground surface within the range 2 mm to 4 mm.

18. The system according to claim 13, wherein each of said two conductive lines is a micro-strip line made of copper or aluminum and drawn on an insulating support.

19. The system according to claim 13, further comprising a memory storage that stores a compartments mapping table to store an association of a shipment identifier stored in a tag affixed onto said shipment and read by said at least one RFID compartment system and of a compartment in which said shipment is deposited.

20. The system according to claim 19, wherein said memory storage further stores a table to store a shipment identifier for a shipment to be deposited in said at least one electronic parcel locker so that said shipment identifier is compared with a shipment identifier stored in a tag affixed onto said shipment and read by said at least one RFID compartment system.

\* \* \* \* \*